US010552228B2

(12) United States Patent
Spivak et al.

(10) Patent No.: US 10,552,228 B2
(45) Date of Patent: Feb. 4, 2020

(54) DISTRIBUTED HIERARCHICAL SCHEDULER

(71) Applicant: VMware, Inc., Palo Alto, CA (US)

(72) Inventors: Vadim Spivak, Emerald Hills, CA (US); Amar Padmanabhan, Menlo Park, CA (US); Anfernee Yongkun Gui, Mountain View, CA (US); Badhri Sampathkumar, Sunnyvale, CA (US); Luca Castellano, San Francisco, CA (US); Maithem Munshed, Palo Alto, CA (US); Michi Mutsuzaki, Sunnyvale, CA (US); Vui Chiap Lam, Menlo Park, CA (US)

(73) Assignee: VMware, Inc., Palo Alto, CA (US)

( * ) Notice: Subject to any disclaimer, the term of this patent is extended or adjusted under 35 U.S.C. 154(b) by 211 days.

(21) Appl. No.: 15/187,772

(22) Filed: Jun. 20, 2016

(65) Prior Publication Data
US 2017/0364392 A1    Dec. 21, 2017

(51) Int. Cl.
*G06F 9/50* (2006.01)
*G06F 9/48* (2006.01)

(52) U.S. Cl.
CPC .......... *G06F 9/5083* (2013.01); *G06F 9/4881* (2013.01)

(58) Field of Classification Search
CPC .............................. G06F 9/5083; G06F 9/4881
See application file for complete search history.

(56) References Cited

U.S. PATENT DOCUMENTS

| 8,576,862 | B2 * | 11/2013 | Sonnier | H04L 47/621 |
| | | | | 370/408 |
| 9,609,048 | B1 * | 3/2017 | Nassi | H04L 67/10 |

(Continued)

FOREIGN PATENT DOCUMENTS

CN    101500022 B  *  3/2013

OTHER PUBLICATIONS

Sharma et al., HybridMR: A Hierarchical MapReduce Scheduler for Hybrid Data Centers, IEEE ICDCS 2013.31, 2013 (Year: 2013).*

(Continued)

*Primary Examiner* — Francisco J Aponte
*Assistant Examiner* — Kevin X Lu
(74) *Attorney, Agent, or Firm* — Thomas | Horstemeyer, LLP (57) ABSTRACT

Techniques disclosed herein provide an approach for assigning resource consumers to available resources. In one embodiment, components of a distributed scheduler are organized into a hierarchy, such as a tree. A placement request received at a root scheduler of the hierarchy is propagated down the hierarchy, either to all children or to randomly selected subsets of children of each scheduler in the hierarchy. Leaf schedulers in the hierarchy that receive the request each propagate back up a score indicating the amount of free resources in its corresponding resource bucket. Branch schedulers then compare scores that they receive, and each further propagate one of the received scores, such as the highest score, based on the comparison, until the root scheduler is reached. The root scheduler makes an additional comparison and returns one of the resource buckets in response to the received placement request.

17 Claims, 3 Drawing Sheets

(56) References Cited

U.S. PATENT DOCUMENTS

| | | | | |
|---|---|---|---|---|
| 2009/0083390 A1* | 3/2009 | Abu-Ghazaleh | ........ | G06F 15/16 709/209 |
| 2009/0323577 A1* | 12/2009 | Agrawal | ............... | H04L 1/0026 370/312 |
| 2010/0131624 A1* | 5/2010 | Ferris | .................... | G06F 9/5072 709/221 |
| 2010/0306379 A1* | 12/2010 | Ferris | .................... | G06F 9/5072 709/226 |
| 2017/0060642 A1* | 3/2017 | Castellano | ............ | G06F 9/5077 |

OTHER PUBLICATIONS

Brandimarte, Routing and Scheduling in a flexible job shop by tabu search, Annals of Operations Research 41(1993)157-183, 1993 (Year: 1993).*

* cited by examiner

DISTRIBUTED HIERARCHICAL SCHEDULER

CROSS-REFERENCE TO RELATED APPLICATION(S)

The present application is related to the patent application entitled "Method and System for Creating and Managing Aggregation Service Hierarchies", which is assigned to the same assignee as the present application and has been filed on the same day as this application. The aforementioned related patent application is herein incorporated by reference in its entirety.

BACKGROUND

A scheduler is a software component that finds optimal assignments of resource consumer requests to available resources. The available resources are typically divided into sets of resource buckets which may represent, e.g., host computers, data stores, networks, etc. The purpose of the scheduler is then to match the needs of a resource consumer to a specific resource bucket. For example, the consumer may obtain a placement of a virtual computing instance (e.g., a virtual machine or container) on a specific host computer, and the virtual computing instance may then be created on that host computer.

SUMMARY

One embodiment provides a computer-implemented method of assigning a resource consumer to one of a plurality of resource buckets. The method generally includes receiving a request to assign the resource consumer. The method further includes propagating the request to assign the resource consumer down a hierarchy of schedulers to one or more leaf schedulers, where each of the one or more leaf schedulers responds to the request by propagating up the hierarchy of schedulers a respective score indicating available resources in a corresponding resource bucket, and where parent schedulers in the hierarchy of schedulers each compare received scores propagated up the hierarchy of schedulers and further propagate up one of the received scores based on the comparison. In addition, the method includes assigning the resource consumer to one of the resource buckets based on a comparison of scores that are propagated completely up the hierarchy.

Another embodiment provides a computer-implemented method of assigning a resource consumer to one of a plurality of resource buckets which generally includes monitoring available resources on one of the resource buckets, and receiving a request to assign the resource consumer, where the request has been propagated down a hierarchy of schedulers from a root scheduler. The method further includes propagating up the hierarchy of schedulers a score indicating available resources in the one of the resource buckets, where parent schedulers in the hierarchy of schedulers each compare received scores that have been propagated up the hierarchy of schedulers and further propagate up one of the received scores based on the comparison, and where the resource consumer is assigned to one of the resource buckets by the root scheduler based on a comparison of scores that are propagated completely up the hierarchy.

Further embodiments include a non-transitory computer-readable storage medium storing instructions that when executed by a computer system cause the computer system to perform the method set forth above, and a computer system programmed to carry out the method set forth above.

DETAILED DESCRIPTION

Embodiments presented herein provide techniques for assigning resource consumers to available resources, i.e., placing the resource consumers. In one embodiment, a distributed scheduler is organized into a hierarchy, such as a tree of schedulers, or into multiple such hierarchies. Placement requests issued to a root scheduler of the hierarchy are propagated down, either to all children or to randomly selected subsets of children of each branch scheduler in the hierarchy, until reaching leaf schedulers of the hierarchy which each monitor available resources in a distinct resource bucket. In turn, each leaf scheduler that receives the request propagates back up the hierarchy a score indicating the amount of free resources in its corresponding resource bucket. Each of the branch schedulers then compares the scores propagated back up that it receives, and further propagates one of the received scores (e.g., the highest score) based on the comparison, until the root scheduler is reached. The root scheduler then makes its own comparison and responds with the identity of, e.g., the highest scoring resource bucket. In the case of placing virtual computing instances, such a resource bucket may be one of the available host computers, and the virtual computing instance may then be created on that host computer.

In embodiments described herein, virtual computing instances, such as virtual machines (VMs) and containers, are sometimes used as examples of resource consumers. However, it should be understood that resource consumers may comprise any consumer of computing resources, including other cloud-native (distributed) applications. Therefore, even though virtual computing instances are used for simplicity in some examples herein, other embodiments are within the scope of this disclosure.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and method illustrated herein may be employed without departing from the principles described herein.

Figure 1:
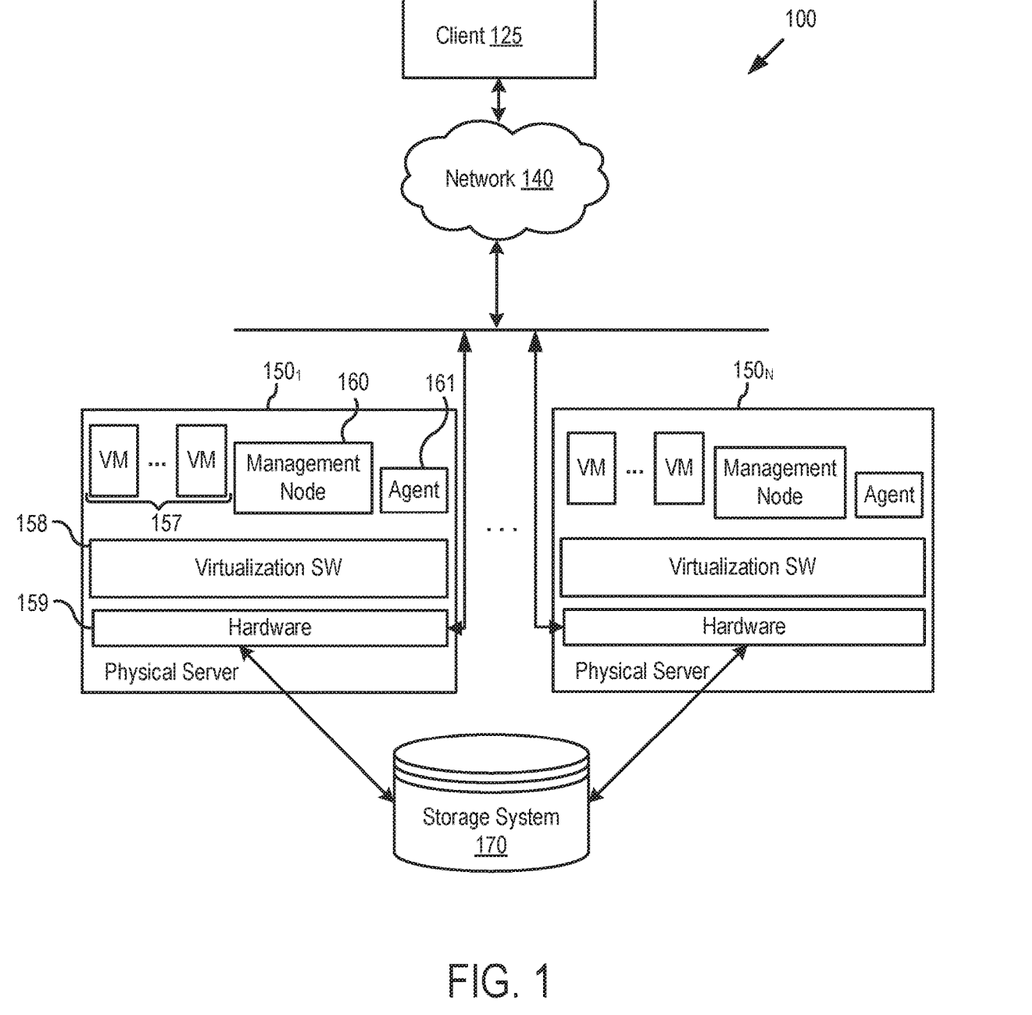
FIG. 1 illustrates components of a computer system architecture in which one or more embodiments of the present invention may be implemented.

FIG. 1 illustrates components of a computer system architecture 100 in which one or more embodiments of the present invention may be implemented. As shown, virtual computing instances (shown as virtual machines (VMs) 157) are instantiated on a plurality of host computers $150_{1-N}$, each of which includes virtualization software 158 and hardware 159, is controlled by a virtual machine management server 140, and is coupled to a shared persistent storage system 170. Although a virtualized system 100 is shown as an example, it should be understood that techniques disclosed herein are equally applicable to non-virtualized systems that do not involve virtual computing instances running on host computers, such as systems with typical operating systems (OSes) running on computers. Host computers $150_{1-N}$ may be constructed on server class hardware platforms, which may be, e.g., x86 architecture platforms that each includes a processor, system memory, and disk drive, among other things. Illustratively, host computers $150_{1-N}$ are in communication with client device 125 via a network 140 (e.g., the Internet). For example, system 100 may be a virtual desktop infrastructure (VDI) in which desktop operating systems, hosted on VMs 157, are delivered as a managed service to end users via network 140. For simplicity, a single network 140 is shown, but it should be recognized that, in actual implementations, the components of system 100 may be connected over the same network or different networks.

Virtualization software layer 158, also referred to hereinafter as the hypervisor, is installed on top of the hardware platform of host computers $150_{1-N}$. Hypervisor 158 supports a virtual machine execution space within which multiple virtual desktops (i.e., virtual machines running desktop operating systems and applications) may be concurrently instantiated and executed. In one embodiment, for each virtual desktop, hypervisor 158 provides a corresponding virtual machine monitor (VMM) that implements virtualization support such as emulated hardware to coordinate operations between hypervisor 158 and the virtual desktop.

Although VMs 157 and hypervisor 158 are shown in FIG. 1, virtual machines are an example of virtual computing instances and hypervisors as an example of a hardware abstraction layer. As discussed, techniques disclosed herein are applicable to other virtual computing instances, such as containers not including a guest operation system (OS), referred to herein as "OS-less containers" or simply "containers," as well as other cloud-native (distributed) applications. OS-less containers in particular implement operating system-level virtualization, wherein an abstraction layer is provided on top of the kernel of an operating system on a host computer. Each OS-less container may run as an isolated process in userspace on the host operating system and share the kernel with other containers. In such a case, the OS-less container relies on the kernel's functionality to make use of resource isolation (CPU, memory, block I/O, network, etc.) and separate namespaces and to isolate the application's view of the operating environments.

In the embodiments described herein, components of an aggregation service are organized into a hierarchy, such as a tree. Such a hierarchy is created by management node(s) 160, running in one or more of host computers $150_{1-N}$, which are responsible for configuring host computers agents 161 to be leaf schedulers that monitor available resources in respective resource buckets (e.g., the host computer itself) and further as root and branch schedulers in the hierarchy, where appropriate, as well as keeping the configured roles up to date to reflect a correct and functional hierarchy, as discussed in greater detail below. In one embodiment, management node(s) 160 may be applications running in OS-less container(s), although it should be understood that management node(s) 160 may also be implemented in other ways (e.g., as applications running in VM(s) 157 or on typical operating system(s)). Each of host computers $150_{1-N}$ further includes an agent 161. In one embodiment, agent 161 may be a process running on hypervisor 158, but it should be understood that agent 161 may also be implemented differently (e.g., as a process or application running on an operating system or inside a VM or OS-less container). Each agent 161 is responsible for registering the host computer 150 in which it runs with management node(s) 160 by transmitting a message notifying management node(s) 160 of the presence of the host computer and resources (e.g., data stores, networks, special hardware, graphics cards, etc.) the host computer has access to. Each agent 161 further receives from management node(s) 160 assignments as leaf, branch, and/or root schedulers, and undertakes the roles of such schedulers in the scheduler hierarchy. In another embodiment, management node(s) 160 may also create multiple hierarchies having both the same logical leaf and root nodes.

After the scheduler hierarchy or hierarchies are created, a placement request may be issued to a scheduler hierarchy, and such a request may then be propagated down the hierarchy, either to all children or to randomly selected subsets of children of each scheduler in the hierarchy, until the leaf schedulers are reached. In turn, each of the leaf schedulers that receives the request propagates back up a score indicating the amount of free resources in its corresponding resource bucket. Each of the branch schedulers then compares the scores propagated back up that it receives, and further propagates one of the received scores, such as the highest score, until the root scheduler is reached. In one embodiment, additional randomization may be introduced by randomly selecting one of a subset of the highest received scores to further propagate up the hierarchy. The root scheduler then makes a further comparison itself, and responds with the identity of, e.g., the highest scoring resource bucket or a random one of the highest scoring resource buckets. Although discussed herein primarily with respect to the highest score being the most desirable placement, it should be understood that any feasible score may be used and, in alternative embodiments, some other score such as the lowest score may be most desirable.

Figure 2:
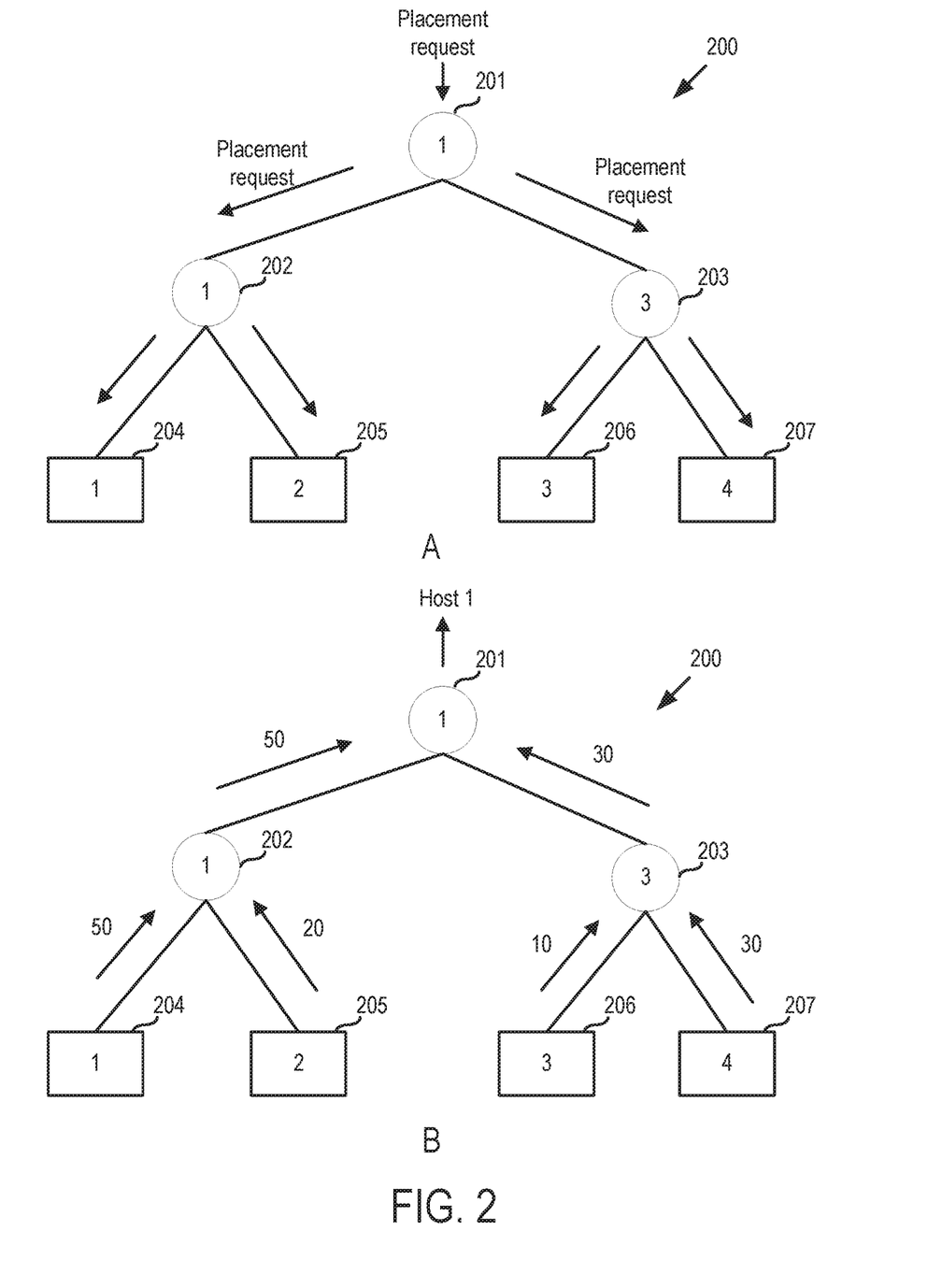
FIG. 2 illustrates an approach for placing a resource consumer using a hierarchy of schedulers, according to an embodiment.

FIG. 2 illustrates an approach for placing a resource consumer using a hierarchy of schedulers, according to an embodiment. As shown, an exemplary hierarchy of schedulers 200 is a tree that includes a root scheduler 201, branch schedulers 202-203, and leaf schedulers 204-205. Each of leaf schedulers 202-203 represents an agent running in a respective host computer that monitors available resources on that host computer. Illustratively, leaf scheduler 204 corresponds to an agent in host 1, leaf scheduler 205 corresponds to an agent in host 2, leaf scheduler 206 corresponds to an agent in host 3, and leaf scheduler 207 corresponds to an agent in host 4. Although discussed with respect to hosts, it should be understood that the resource buckets need not be host computers but may instead by any set of resources that can be divided into independent buckets (e.g., independent data stores).

The roles of branch schedulers 202 and 203, which are intermediate schedulers between leaf schedulers 202-203 and root scheduler 101, are assigned to agents running in hosts 1 and 3, respectively, and the role of root scheduler 201 is also assigned to the agent running in host 1. As discussed, host agents may take on multiple roles, as leaf schedulers as well as branch and root schedulers, as appropriate. In one embodiment, a hierarchy of schedulers such as hierarchy 200 may be created by one or more management nodes 160 with which agents in host computers 1-4 register. In such a case, a first host computer agent (in host 1 in this example) from which a registration message is received is configured as a leaf scheduler 204 and also as the root scheduler 201, as hierarchy 200 did not previously have a root scheduler. Subsequent agents in host computer 2-4, from which registration messages are received, are also configured as leaf schedulers 205-207. In addition, when a plurality of host computer agents are configured as leaf schedulers that are siblings in the hierarchy of schedulers, such as leaf schedulers 204-205 and 206-207, one of the plurality of host computer agents is further configured as a branch scheduler that is a parent to the sibling leaf schedulers. For example, when the agent in host 2 registers with the management node(s) 160 and is assigned to leaf scheduler 205, management node(s) 160 may further assign the agent in host 1 as branch scheduler 202 that is the parent of leaf schedulers 204-205 and a child of root scheduler 201.

In one embodiment, management node(s) 160 may determine where to add host agents in hierarchy 200 using a clustering heuristic and a maximum branching factor. The maximum branching factor specifies the maximum number of children each scheduler in hierarchy 200 can have and/or the maximum number of levels that hierarchy 200 can have. The clustering heuristic is a property that logically clusters similar host computers and must be satisfied to assign a particular scheduler role to a host computer agent. Clustering may permit hosts with access to desired resources to be located more easily, as similar hosts are clustered together in hierarchy 200. The clustering heuristic may thus help maximize a schedule-and-place operation's efficiency when using hierarchy 200. In one embodiment, the clustering heuristic may specify that resources available to a host must be a superset or a subset of resources available to a leaf node (and to branch nodes, if any, which are unions of all child sets) to which the host's agent is being added, where the resources may include any attributes such as network connections, access to datastores, auxiliary hardware being on the hosts, etc.

It should be understood that scheduler hierarchy 200 is scalable, as new host computer agents may be added to or removed from hierarchy 200 as leaf schedulers and also as branch schedulers and the root scheduler, where appropriate. Management node(s) 160 may also dynamically mutate scheduler hierarchy 200 to adapt when hosts become unavailable by reassigning other host agent to take the roles (e.g., as branch or leaf schedulers) of unavailable host agents, thereby providing fault tolerance. If one or more hosts leave the system entirely, their corresponding leaf and branch schedulers may also be deactivated. In addition, the hierarchy may be restructured to have more or fewer levels, thereby increasing or decreasing the number of branch schedulers in the path between root scheduler 201 and leaf schedulers. For example, if an agent in a host computer that is not powerful is assigned to be root scheduler 201, then the number of levels may be increased to reduce the load on root scheduler 201, and vice versa.

As shown in Panel A, a placement request, such as a request to place a virtual computing instance (e.g., a VM or OS-less container) on a host computer, is received at root scheduler 201 and propagated down hierarchy 200 to branch schedulers 202-203 and ultimately to leaf schedulers 204-207 that monitor available resources on distinct host computers. In one embodiment, root and branch schedulers 201-203 may propagate the request to each of their children. In an alternative embodiment, root and branch schedulers 201-203 may each select a random subset of their children to propagate the request to so as to obtain a relatively even distribution of resources to resource consumers.

As shown in Panel B, upon receiving the placement request propagated down hierarchy 200, leaf schedulers 204-207 each propagate back up a score indicating the amount of free resources in its corresponding resource bucket. In the case of placing a virtual computing instance, the score may be a numerical value indicating a total amount of CPU, memory, disk space, and/or other resources that is free on a corresponding host computer, a fraction of the resources that is free on the host computer, or the like. Each of branch schedulers 202-203 compares the scores received from its children and further propagates one of the received scores based on the comparison, until root scheduler 201 is reached. In one embodiment, each branch scheduler 202-203 may further propagate the highest received score. In an alternative embodiment, each branch scheduler 202-203 may randomly select one score from a subset of the highest received scores to propagate up hierarchy 200. That is, rather than always selecting the very highest score, the branch scheduler may select one of a number of received messages with the highest scores to pass up the hierarchy 200. Then, root scheduler 201 makes its own comparison of received scores and selects the resource bucket having the highest score (or a random one of the resource buckets among those having the highest scores) to place the resource consumer on. In the case of placing the virtual computing instance, the selected resource bucket may be a particular host computer, and the virtual computing instance may then be created on that host computer according to the placement.

Illustratively, leaf schedulers 204-207 propagate up messages indicating scores of 50, 20, 10, and 30, respectively. The highest scores of 50 and 30 are further propagated by branch schedulers 202-203 up to root scheduler 201, which ultimately selects host 1, whose agent (leaf scheduler 204) responded with the highest score of 50, for the requested placement.

Figure 3:
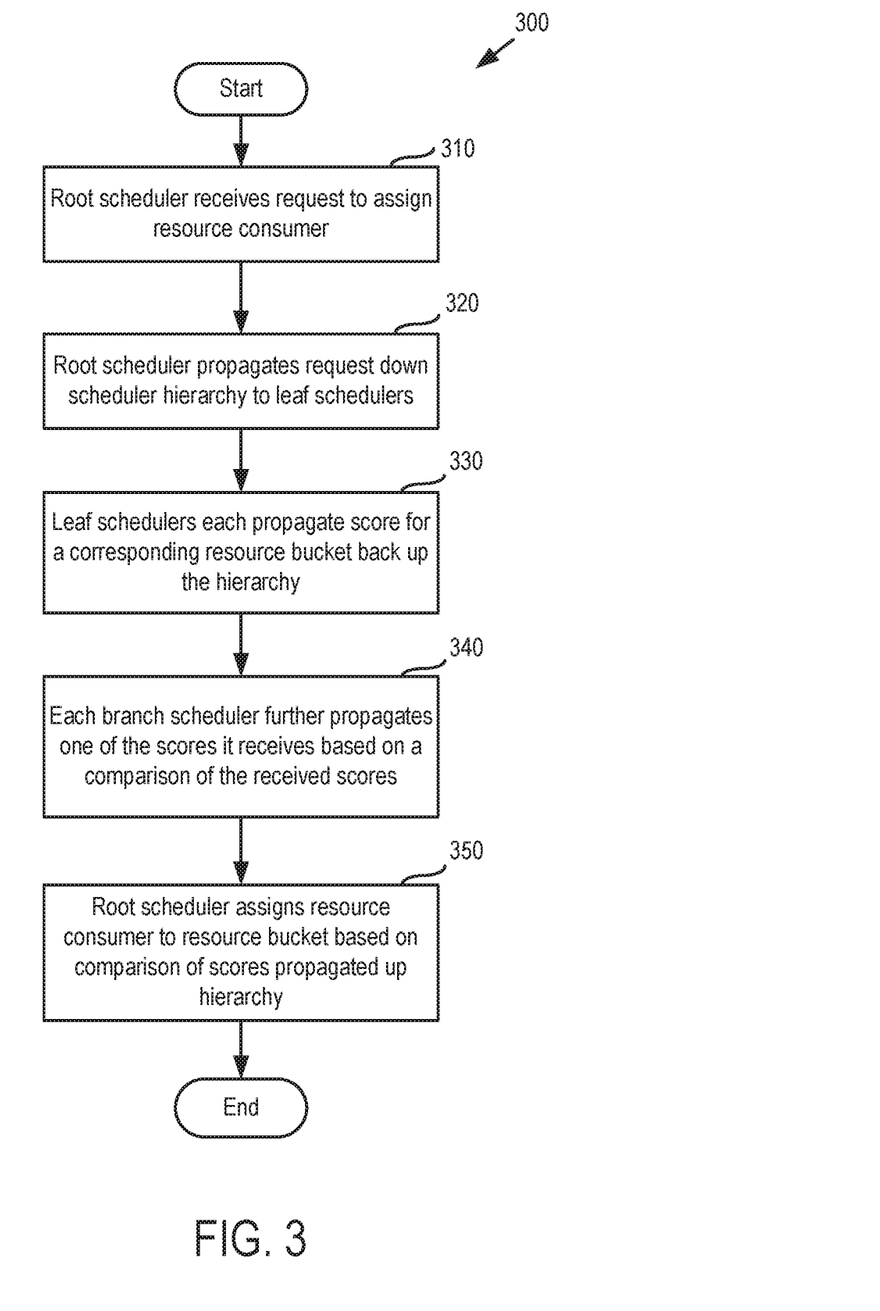
FIG. 3 illustrates a method of assigning a resource consumer to available resources, according to an embodiment.

FIG. 3 illustrates a method 300 of assigning a resource consumer to available resources, according to an embodiment. As shown, method 300 begins at step 310, where a root scheduler of a hierarchy of schedulers receives a request to assign the resource consumer. In one embodiment, the resource consumer may be a virtual computing instance (e.g., a VM or OS-less container) that needs to be placed on a host computer, and each of the resource buckets may represent one host computer. In other embodiments, the resource consumer may be any application, process, etc. that requires a given amount of computing resources.

At step 320, the request is propagated down the hierarchy of schedulers from the root scheduler to leaf schedulers. During such propagation, the root scheduler transmits a message which includes the request to its children in the hierarchy of schedulers, and, in turn, the children transmit further messages which include the request to their children, until the leaf schedulers in the hierarchy are reached. In one embodiment, each scheduler may propagate the request to all of its children. In an alternative embodiment, the root and branch schedulers may each select a random subset of their children to propagate the request to. Such random selection of children helps ensure that different placement results are returned to obtain a relatively even distribution of resources to resource consumers.

At step 330, in response to receiving the request, the leaf schedulers each transmit a score for a corresponding resource bucket back up the hierarchy of schedulers. That is, the leaf schedulers, which each monitors resources available on a corresponding resource bucket, send messages which include the respective scores for their corresponding resource buckets and indications of the buckets themselves to their parents in the hierarchy. Any feasible score may be used to indicate resource availability in each of the buckets. In the case of placing a virtual computing instance, the score may be a numerical value indicating a total amount of CPU, memory, disk space, and/or other resources that is free on an associated host computer, a fraction of the resources that is free on the host computer, or the like. For example, a high score may indicate that the host computer has plenty of free resources and is therefore a desirable resource bucket to place the virtual computing instance on. Conversely, a low score may indicate that the host computer has little free resources and is not a good candidate to place the virtual computing instance on.

At step 340, each branch scheduler further transmits one of the scores it receives up the hierarchy of schedulers based on a comparison of the received scores. Continuing the example above of placing a virtual computing instance on a host, each branch scheduler may select, e.g., the highest score received from its children and transmit a message to its parent which includes the highest score and an indication of the corresponding resource bucket.

In one embodiment, further randomization may be introduced by randomly selecting one of a subset of the highest received scores to send up the hierarchy. For example, each branch scheduler may randomly select one of three received messages with the highest scores to pass up the tree, rather than always selecting the received message with the very highest score. As discussed, randomization helps provide an even distribution of resources to the resource consumers.

At step 350, the root scheduler assigns the resource consumer to one of the resource buckets based on a comparison of the scores propagated up the hierarchy that are received by the root scheduler. Similar to the branch schedulers discussed above with respect to step 340, the root scheduler may receive, from its children, a number of messages which include scores corresponding to respective resource buckets. The root scheduler may then choose the resource bucket with the highest score, or randomly choose from a subset of resource buckets with the highest scores, to assign the resource consumer to. In the case of placing a virtual computing instance on a host computer, such an assignment may then be used to notify the appropriate host computer to create the virtual computing instance on that host computer.

Although method 300 is discussed above with respect to use of a single scheduler hierarchy, in another embodiment, multiple such hierarchies of schedulers may be created that share the same set of leaves but have different root and branch schedulers. Such a multi-scheduler may provide fault tolerance and is capable of handling a larger volume of concurrent resource consumer placement requests, as each of the requests may be handled by a distinct scheduler hierarchy. For example, assigning multiple host agents as root nodes provides fault tolerance, as another root node may take over when one root node becomes unavailable. In one embodiment, one root node may be in an active mode, while other root node(s) are kept in a standby mode until the active root node goes down. In another embodiment, more than one root node may be active. In addition to multiple root nodes, multiple different branch nodes may also be used in the multiple scheduler hierarchies.

Advantageously, techniques disclosed herein permit placement of resource consumers into resource buckets, such as placement of virtual computing instances (e.g., VMs or OS-less containers) on host computers, using a hierarchy of schedulers. The resource consumers may be placed on hosts having different capabilities. The scheduler hierarchy is also able to adapt as new resource buckets are added or removed by restructuring the hierarchy to add or remove leaf and branch schedulers, and the like. Doing so provides scalability and helps to minimize the number of failed placement operations. In addition, randomization may be introduced when propagating placement requests down the scheduler hierarchy or when propagating scores back up the scheduler hierarchy to help evenly distribute resource consumers across available resource buckets.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operation system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A computer-implemented method of assigning a resource consumer to one of a plurality of resource buckets, comprising:

receiving a request to assign the resource consumer in a root scheduler;

propagating the request to assign the resource consumer down a hierarchy of schedulers to a randomly selected subset of one or more leaf schedulers by propagating the request to a random subset of children of each scheduler in the hierarchy which receives the request, wherein each of the randomly selected subset of the one or more leaf schedulers responds to the request by propagating up the hierarchy of schedulers a respective score indicating available CPU, memory, and disk space in a corresponding resource bucket, and wherein parent schedulers in the hierarchy of schedulers each compare the respective score corresponding to the each of the randomly selected subset of the one or more leaf schedulers propagated up the hierarchy of schedulers;

selecting, at parent schedulers, a highest score from the respective highest score corresponding to each of the randomly selected subset of the one or more leaf schedulers, wherein the parent schedulers further propagate up a selected highest score based on the comparison;

receiving the selected highest score in the root scheduler; and assigning the resource consumer to one of the resource buckets based on a comparison of the selected highest score received from the parent schedulers propagated completely up the hierarchy by randomly selecting a corresponding resource bucket from the selected highest score received from the parent schedulers.

2. The computer-implemented method of claim 1, wherein the selected highest score is further propagated up based on the comparison corresponds to a resource bucket with either the largest quantity of free resources or the largest percentage of free resources compared to other resource buckets for which scores are received.

3. The computer-implemented method of claim 1, further comprising, adding at least one of a leaf scheduler, a branch scheduler, and a root scheduler to the hierarchy of schedulers in response to addition of a resource bucket to the plurality of resource buckets.

4. The computer-implemented method of claim 1, further comprising, deactivating at least one of a branch scheduler and a root scheduler in response to removal of a corresponding one of the resource buckets from the plurality of resource buckets.

5. The computer-implemented method of claim 1, wherein the hierarchy of schedulers is a tree hierarchy.

6. The computer-implemented method of claim 1, wherein the hierarchy of schedulers is one of a plurality of hierarchies of schedulers that receive and service requests to assign resource consumers, each of the hierarchy of schedulers including the same leaf schedulers but different root and branch schedulers.

7. The computer-implemented method of claim 1, wherein:

the resource consumer is a virtual computing instance; and the resource buckets are host computers.

8. The computer-implemented method of claim 7, wherein:

a respective agent running in each of the host computers acts as the leaf scheduler for the host computer; and one or more of the agents further act as the root scheduler and the branch schedulers.

9. A non-transitory computer-readable storage medium containing a program which, when executed by one or more processors, performs operations for assigning a resource consumer to one of a plurality of resource buckets, the operations comprising:

receiving a request to assign the resource consumer in a root scheduler;

propagating the request to assign the resource consumer down a hierarchy of schedulers to a randomly selected subset of one or more leaf schedulers by propagating the request to a random subset of children of each scheduler in the hierarchy which receives the request, wherein each of the randomly selected subset of the one or more leaf schedulers responds to the request by propagating up the hierarchy of schedulers a respective score indicating available CPU, memory, and disk space in a corresponding resource bucket, and wherein parent schedulers in the hierarchy of schedulers each compare the respective score corresponding to the each of the randomly selected subset of the one or more leaf schedulers propagated up the hierarchy of schedulers;

selecting, at parent schedulers, a highest score from the respective highest score corresponding to each of the randomly selected subset of the one or more leaf schedulers, wherein the parent schedulers further propagate up a selected highest score based on the comparison;

receiving the selected highest score in the root scheduler; and     assigning the resource consumer to one of the resource buckets based on a comparison of the selected highest score received from the parent schedulers propagated completely up the hierarchy by randomly selecting a corresponding resource bucket from the selected highest score received from the parent schedulers.

10. The non-transitory computer-readable storage medium of claim 9, wherein propagating the request down the hierarchy of schedulers includes propagating the request to a random subset of children of each scheduler in the hierarchy which receives the request.

11. The non-transitory computer-readable storage medium of claim 9, wherein the selected highest score that is further propagated up based on the comparison corresponds to a resource bucket with either the largest quantity of free resources or the largest percentage of free resources compared to other resource buckets for which scores are received.

12. The non-transitory computer-readable storage medium of claim 9, the operations further comprising, adding at least one of a leaf scheduler, a branch scheduler, and a root scheduler to the hierarchy of schedulers in response to addition of a resource bucket to the plurality of resource buckets.

13. The non-transitory computer-readable storage medium of claim 9, the operations further comprising, deactivating at least one of a branch scheduler and a root scheduler in response to removal of a corresponding one of the resource buckets from the plurality of resource buckets.

14. The non-transitory computer-readable storage medium of claim 9, wherein the hierarchy of schedulers is a tree hierarchy.

15. The non-transitory computer-readable storage medium of claim 9, wherein the hierarchy of schedulers is one of a plurality of hierarchies of schedulers that receive and service requests to assign resource consumers, each of the hierarchy of schedulers including the same leaf schedulers but different root and branch schedulers.

16. The non-transitory computer-readable storage medium of claim 9, wherein:

the resource consumer is a virtual computing instance; and     the resource buckets are host computers.

17. A computer-implemented method of assigning a resource consumer to one of a plurality of resource buckets, comprising:

monitoring available resources on one of the resource buckets;

receiving a request to assign the resource consumer, wherein the request has been propagated down a hierarchy of schedulers from a root scheduler that received an initial request to assign the resource consumer to a randomly selected subset of leaf schedulers by propagating the request to a random subset of children of each scheduler in the hierarchy which receives the request; and     propagating up the hierarchy of schedulers a respective score indicating available CPU, memory, and disk space in the one of the resource buckets,         wherein parent schedulers in the hierarchy of schedulers each compare received scores corresponding to the each of the randomly selected subset of the one or more leaf schedulers propagated up the hierarchy of schedulers, and         wherein the parent schedulers select a highest score from the respective highest score corresponding to each of the randomly selected subset of the one or more leaf schedulers and further propagate up a respective highest score based on the comparison, and     assigning the resource consumer a selected one of the resource buckets by the root scheduler receiving the selected highest score, comparing the selected highest score received from the parent schedulers propagated completely up the hierarch, and randomly selecting a resource bucket from the selected highest score received from the parent schedulers to assign to the resource consumer.

\* \* \* \* \*